(12) United States Patent
Friedman et al.

(10) Patent No.: US 7,507,493 B2
(45) Date of Patent: Mar. 24, 2009

(54) ELECTROCHEMICAL CELL HAVING PROTECTION AGAINST CREEP

(75) Inventors: Jacob Friedman, Storrs, CT (US); Greg Hanlon, Windsor, CT (US)

(73) Assignee: Froton Energy Systems, Inc., Wallingford, CT (US)

( * ) Notice: Subject to any disclaimer, the term of this patent is extended or adjusted under 35 U.S.C. 154(b) by 765 days.

(21) Appl. No.: 10/908,879

(22) Filed: May 31, 2005

(65) Prior Publication Data

US 2006/0266641 A1   Nov. 30, 2006

(51) Int. Cl.
 *H01M 2/08* (2006.01)
(52) U.S. Cl. .............. 429/35; 429/32; 429/36; 429/38; 429/39; 204/252; 204/253; 204/254; 204/263
(58) Field of Classification Search .......... 429/32, 429/35, 36, 38, 39; 204/252, 253, 254, 263
See application file for complete search history.

(56) References Cited

U.S. PATENT DOCUMENTS

| | | | |
|---|---|---|---|
| 5,912,088 A * | 6/1999 | Ernst | 429/35 |
| 6,653,011 B2 | 11/2003 | Dristy | |
| 2005/0089746 A1 * | 4/2005 | James et al. | 429/35 |

OTHER PUBLICATIONS

Stanic, Vesna, "Durability of Membrane Electrode Assemblies (MEAs) In Pem Fuel Cells Operated on Pure Hydrogen and Oxygen", AIAA 5965:2003.

* cited by examiner

*Primary Examiner*—Bruce F Bell
(74) *Attorney, Agent, or Firm*—Cantor Colburn LLP

(57) ABSTRACT

An electrochemical cell having a membrane electrode assembly (MEA), and a gas diffusion layer (GDL) disposed proximate a side of the MEA with an edge of the GDL disposed inboard of an edge of the MEA is disclosed. A sealing member is disposed proximate the edge of the GDL and extends outward toward the edge of the MEA, thereby defining a discontinuity between the GDL and the sealing member. A protector member is disposed between the MEA and the GDL such that the protector member traverses the discontinuity.

23 Claims, 7 Drawing Sheets

Detail A

ELECTROCHEMICAL CELL HAVING PROTECTION AGAINST CREEP

BACKGROUND OF INVENTION

The present disclosure relates generally to electrochemical cells, and particularly to electrochemical cells having a member to protect a proton exchange membrane.

Electrochemical cells are energy conversion devices, and can be classified as electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exits cell 100, while protons 106 and water 110 migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Water can also be introduced with the feed gas. The hydrogen gas for fuel cell operation can originate from a pure hydrogen source, hydrocarbon, methanol, or any other hydrogen source that supplies hydrogen at a purity suitable for fuel cell operation (i.e., a purity that does not poison the catatlyst or interfere with cell operation). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include a number of individual cells arranged in a stack, with the working fluids directed through the cells via input and output conduits formed within the stack structure. The cells within the stack are sequentially arranged, each including a cathode, a proton exchange membrane, and an anode. The cathode and anode may be separate layers or may be integrally arranged with the membrane. Each cathode/membrane/anode assembly (hereinafter "membrane electrode assembly", or "MEA") typically has a first flow field in fluid communication with the cathode and a second flow field in fluid communication with the anode. The MEA may furthermore be supported on both sides by screen packs or bipolar plates disposed within flow fields. Screen packs or bipolar plates may facilitate fluid movement to and from the MEA, membrane hydration, and may also provide mechanical support for the MEA.

In order to maintain intimate contact between cell components under a variety of operational conditions and over long time periods, uniform compression is applied to the cell components. Pressure pads or other compression means are often employed to provide even compressive force from within the electrochemical cell. In electrochemical cells having high internal operational pressures, fluid-like movement due to creep may be experienced by some internal components, especially the MEA.

While existing internal components are suitable for their intended purposes, there still remains a need for improvement, particularly regarding creep protection. Accordingly, a need exists for improved internal cell components of an electrochemical cell that can operate at sustained high pressures and low resistivities, while offering improved creep protection.

BRIEF DESCRIPTION OF THE INVENTION

Embodiments of the invention include an electrochemical cell having a membrane electrode assembly (MEA), and a gas diffusion layer (GDL) disposed proximate a side of the MEA with an edge of the GDL disposed inboard of an edge of the MEA. A sealing member is disposed proximate the edge of the GDL and extends outward toward the edge of the MEA, thereby defining a discontinuity between the GDL and the sealing member. A protector member is disposed between the MEA and the GDL such that the protector member traverses the discontinuity.

Other embodiments of the invention include a proton exchange membrane electrolysis cell having a membrane electrode assembly (MEA), and a gas diffusion layer (GDL) disposed proximate a side of the MEA with an edge of the GDL disposed inboard of an edge of the MEA. A sealing member is disposed proximate the edge of the GDL and extends outward toward the edge of the MEA, thereby defining a discontinuity between the GDL and the sealing member. A protector member is disposed between the MEA and the GDL such that the protector member traverses the discontinuity. A porous member is disposed proximate the side of the MEA opposite that of the GDL, a first cell separator plate is disposed on one side of the MEA, and a second cell separator plate is disposed on the other side of the MEA. The cell separator plates are configured to retain the MEA, the GDL, the sealing member, the protector member, and the porous member under operational conditions. The region of the MEA inboard of the discontinuity defines an active area that experiences a pressure equal to or greater than about 100 pounds per square inch in response to the cell being operational.

Further embodiments of the invention include an electrochemical cell having a membrane electrode assembly (MEA), and a gas diffusion layer (GDL) disposed proximate a side of the MEA with an edge of the GDL disposed inboard of an edge of the MEA. A first sealing member is disposed proximate the edge of the GDL and extends outward toward the edge of the MEA, thereby defining a discontinuity between the GDL and the first sealing member. A protector member is disposed between the MEA and the GDL such that the protector member traverses the discontinuity, the protector member having a thickness equal to or less than about ¼ of the thickness of the GDL and being bonded to the GDL. A flow field member is disposed proximate the side of the MEA opposite that of the GDL, an edge of the flow field member being disposed inboard of the edge of the MEA. A second sealing member is disposed proximate the edge of the flow field member and extends outward toward the edge of the MEA. A first plate member is disposed proximate the side of the GDL opposite that of the MEA, the first plate member having a first sealing feature that cooperates with the first sealing member. A second plate member is disposed proximate the side of the flow field member opposite that of the MEA, the second plate member having a second sealing feature that cooperates with the second sealing member.

BRIEF DESCRIPTION OF THE DRAWINGS

Referring now to the figures wherein like elements are numbered alike.

DETAILED DESCRIPTION OF THE INVENTION

Disclosed herein are novel embodiments for an electrochemical cell having a gas diffusion layer (GDL) proximate a MEA and a protector member that prevents, or at least reduces the amount of, creep of the MEA at an edge of the GDL.

Although the disclosure herein is described in relation to a proton exchange membrane (PEM) electrochemical cell employing hydrogen, oxygen, and water, other types of electrochemical cells and/or electrolytes and/or reactants may be used in accordance with embodiments of the invention and the teachings disclosed herein. Upon the application of different reactants and/or different electrolytes, the flows and reactions are understood to change accordingly, as is commonly understood in relation to that particular type of electrochemical cell.

Figure 1:
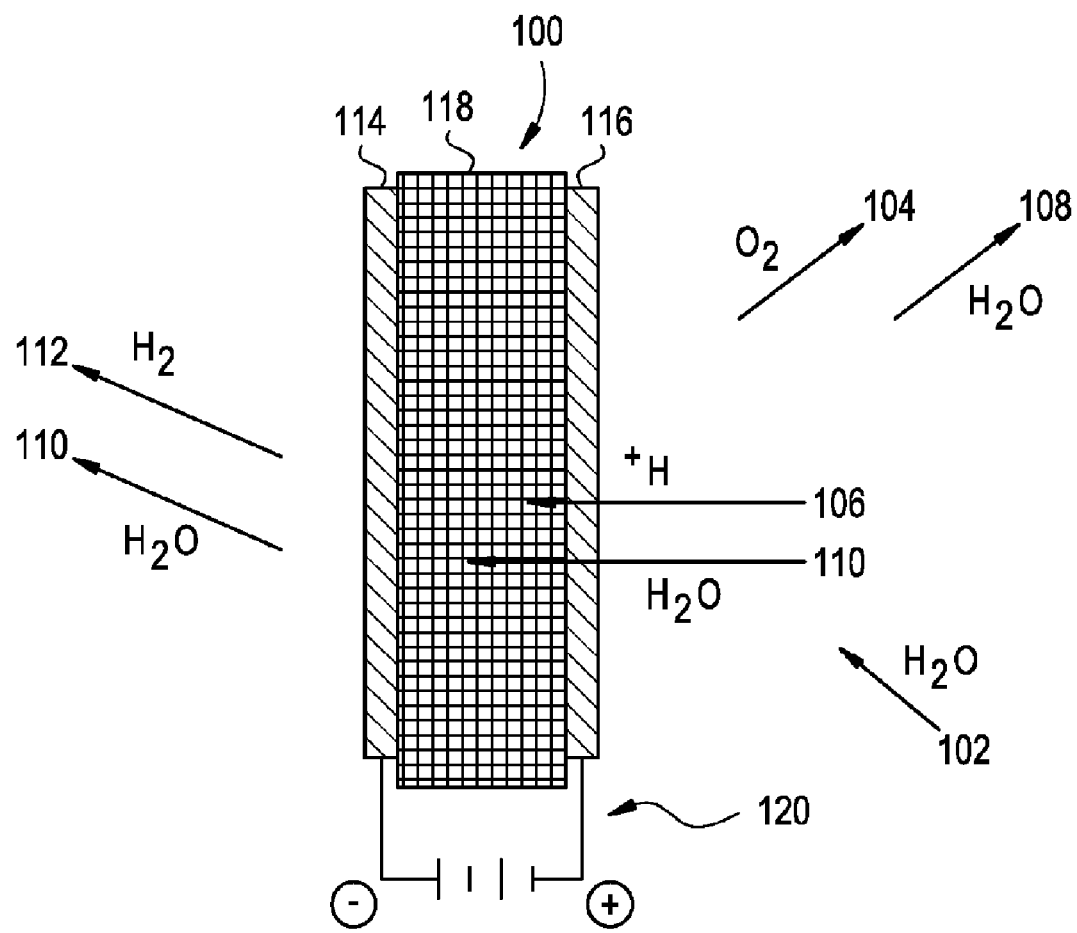
FIG. 1 depicts a schematic diagram of a partial electrochemical cell showing an electrochemical reaction for use in accordance with embodiments of the invention.
Figure 2:
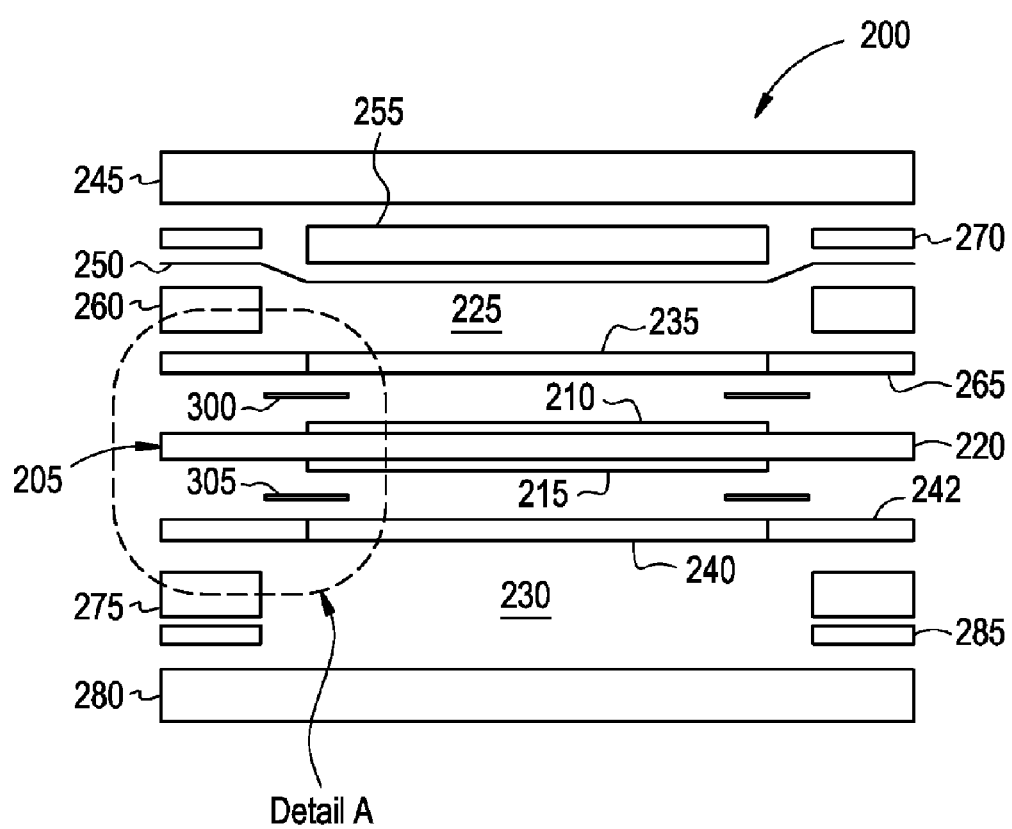
FIG. 2 depicts an expanded section view through an exemplary electrochemical cell in accordance with embodiments of the invention.

Referring to FIG. 2, an electrochemical cell (cell) 200 suitable for operation as an anode feed electrolysis cell, cathode feed electrolysis cell, fuel cell, or regenerative fuel cell is depicted in an exploded assembly isometric view. Thus, while the discussion below is directed to an anode feed electrolysis cell, cathode feed electrolysis cells, fuel cells, and regenerative fuel cells are also contemplated. Cell 200 is typically one of a plurality of cells employed in a cell stack as part of an electrochemical cell system. When cell 200 is used as an electrolysis cell, power inputs are generally between about 1.48 volts and about 3.0 volts, with current densities between about 50 A/ft2 (amperes per square foot) and about 4,000 A/ft2. When used as a fuel cells power outputs range between about 0.4 volts and about 1 volt, and between about 0.1 A/ft2 and about 10,000 A/ft2. The number of cells within the stack, and the dimensions of the individual cells is scalable to the cell power output and/or gas output requirements. Accordingly, application of electrochemical cell 200 may involve a plurality of cells 200 arranged electrically either in series or parallel depending on the application.

Cells may be operated at a variety of pressures, such as up to or exceeding about 100 psi, up to or exceeding about 500 psi, up to or exceeding about 2500 psi, or even up to or exceeding about 10,000 psi, for example. Cell 200 includes a membrane-electrode-assembly (MEA) 205 having a first electrode (e.g., cathode) 210 and a second electrode (e.g., anode) 215 disposed on opposite sides of a proton exchange membrane (membrane) 220. Flow fields 225, 230, which are in fluid communication with electrodes 210 and 215, respectively, are defined generally by the regions proximate to, and bounded on at least one side by, each electrode 210 and 215 respectively. A flow field member 235 may be disposed within flow field 225 between electrode 210, a cell separator plate 245 and, optionally, a pressure pad separator plate 250. In an embodiment, flow field member 235 is a gas diffusion layer (GDL), which will be discussed in more detail below. A pressure pad 255 may be disposed between pressure pad separator plate 250 and cell separator plate 245. In an embodiment, cell separator plate 245 is disposed adjacent to pressure pad 255. A frame 260 generally surrounds flow field 225, and in an embodiment, a first sealing gasket 265 is disposed around GDL 235 and between frame 260 and MEA 205 for enhancing the seal within the reaction chamber defined on one side of cell 200 by frame 260, pressure pad separator plate 250 and electrode 210. Another gasket 270 may be disposed between pressure pad separator plate 250 and cell separator plate 245 enclosing pressure pad 255.

Another flow field member 240 may be disposed in flow field 230. In an embodiment, flow field member 240 is a porous plate, which will be discussed in more detail below. A frame 275 generally surrounds flow field member 240, and in an embodiment, a second sealing gasket 242 is disposed around porous plate 240 and between frame 275 and MEA 205. A cell separator plate 280 is disposed adjacent flow field member 240 opposite oxygen electrode 215, and a gasket 285 is disposed between frame 275 and cell separator plate 280. Gaskets 242 and 285 generally enhance the seal within the reaction chamber defined by frame 275, cell separator plate 280, and electrode 215. The cell components, particularly cell separator plates (also referred to as manifolds) 245, 280, frames 260, 275, and gaskets 242, 265, 270, and 285 may be formed with suitable manifolds or other conduits for fluid flow.

In accordance with an embodiment of the invention, a first protector member 300 may be disposed between GDL 235 and MEA 205, and/or a second protector member 305 may be disposed between porous plate 240 and MEA 205. Protector members 300, 305 may be layers or rings, may be electrically conductive or non-conductive, may or may not be bonded to adjacent parts of the cell assembly, and may or may not extend to the outer edge of the MEA 205. In an embodiment, protector member 300 and/or protector member 305 is made from polysulfone. Protector members 300, 305 may be on the order of about 0.003 inches thick, making them equal to or less than about ¼ the thickness of GDL 235 when GDL 235 is about 0.016 inches thick. In an embodiment, GDL 235 is made from Toray™ TGPH-Type carbon paper (commercially available off the shelf from Toray Industries). Various arrangements of protector members 300, 305 within cell 200 will be discussed in more detail below.

In an embodiment, membrane 220 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene)glycol, poly(oxyethylene-co-oxypropylene)glycol monoether, and poly(oxyethylene-co-oxypropylene)glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon-and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Electrodes 210 and 215 comprise a catalyst suitable for performing the needed electrochemical reaction (i.e., electrolyzing water and producing hydrogen). Suitable catalyst include, but are not limited to, materials comprising platinum, palladium, rhodium, carbon, gold, tantalum, tungsten, ruthenium, iridium, osmium, alloys of at least one of the foregoing catalysts, and the like. Electrodes 210 and 215 can be formed on membrane 220, or may be layered adjacent to, but in contact with, membrane 220.

In an embodiment, flow field members 235, 240 may be screen packs, bipolar plates, porous plates, or other support members suitable for the purposes disclosed herein. As previously discussed, in an embodiment, flow field member 235 is a GDL, and flow field member 240 is a porous plate. In an embodiment, GDL 235 is fabricated of carbon and includes flow channels for the passage of fluid and/or gas. A screen or bipolar plate capable of supporting membrane 220, allowing the passage of system fluids, and preferably conducting electrical current is desirable. In an embodiment, a bipolar plate may be used in conjunction with a GDL, which will be discussed in more detail below. In an embodiment, the screens may comprise layers of perforated sheets or a woven mesh formed from metal or strands. These screens are typically comprised of metals, such as, for example, niobium, zirconium, tantalum, titanium, carbon steel, stainless steel, nickel, cobalt, and alloys comprising at least one of the foregoing metals. The geometry of the openings in the screens can range from ovals, circles, and hexagons to diamonds and other elongated shapes. Bipolar plates are commonly porous structures comprising fibrous carbon or fibrous carbon impregnated with polytetrafluoroethylene or PTFE (commercially available under the trade name TEFLON® from E. I. du Pont de Nemours and Company). However, the bipolar plates are not limited to carbon or PTFE impregnated carbon, they may also be made of any of the foregoing materials used for the screens, such as niobium, zirconium, tantalum, titanium, carbon steel, stainless steel, nickel, cobalt, and associated alloys, for example.

Pressure pad 255 provides for uniform compression between cell components and may comprise a resilient member or an elastically compressible member. Where pressure pad 255 comprises a resilient member, an elastomeric material is preferable. Suitable elastomeric materials include, but are not limited to silicones, such as, for example, fluorosilicones; fluoroelastomers, such as KALREZÒ (commercially available from E. I. du Pont de Nemours and Company), VITONÒ (commercially available from E. I. du Pont de Nemours and Company), and FLUORELÒ (commercially available from Minnesota Mining and Manufacturing Company, St. Paul, Minn.); and combinations thereof.

Where pressure pad 255 comprises an elastically compressible member, a compressible carbon material absent metal or metallic plating may be used. Suitable compressible carbon materials include, but are not limited to carbon paper, carbon sheet, or carbon cloth, such as B-1 carbon cloth or B-2 Toray carbon paper (commercially available from E-TEK, De Nora Elettrodi Network) and TGP-H-1.0t and TGP-H-1.5t (commercially available from Toray Industries). When used without pressure pad separator plate 250, pressure pad 255 may be porous to allow passage of water or system gases.

With reference now to FIGS. 3-9, various partial embodiments of Detail-A depicted in FIG. 2 will now be discussed. Referring generally to FIGS. 3-9, a bipolar plate 310 with sealing features 315 is disposed between GDL 235 and frame 260. Sealing features 315, which may be raised ridges, recess channels or any feature suitable for the intended purpose, cooperate with sealing gasket 265. However, it will be appreciated that cell 200 may be absent bipolar plate 310, and that sealing features 315 may be incorporated into frame 260 to serve the same purpose. As depicted, GDL 235 has an edge 320 that is inboard of edge 325 of MEA 205. As also depicted, sealing gasket 265 has an edge 330 disposed proximate edge 320 of GDL 235, and extends outward toward edge 325 of MEA 205. As such, edges 320 and 330 define a discontinuity 335 between GDL 235 and sealing gasket 265. Under high load conditions and over time, membrane 220 of MEA 205 will tend to creep into the region at discontinuity 335, which may result in thinning of membrane 220, puncture of and leaking across membrane 220, and where GDL 335 is made of carbon material having frays at edge 320 proximate MEA 205, electrical shorting across membrane 220 may result. In an effort to prevent undesirable creep, embodiments of the invention employ protector members 300, 305, which will now be discussed in more detail. While FIGS. 3-7 depict only one side of MEA 205 where GDL 235 is located, it will be appreciated that a similar arrangement may be employed on the other side of MEA 205 where porous plate 240 is located, such as that depicted in FIGS. 8-9 for example.

Figure 3:
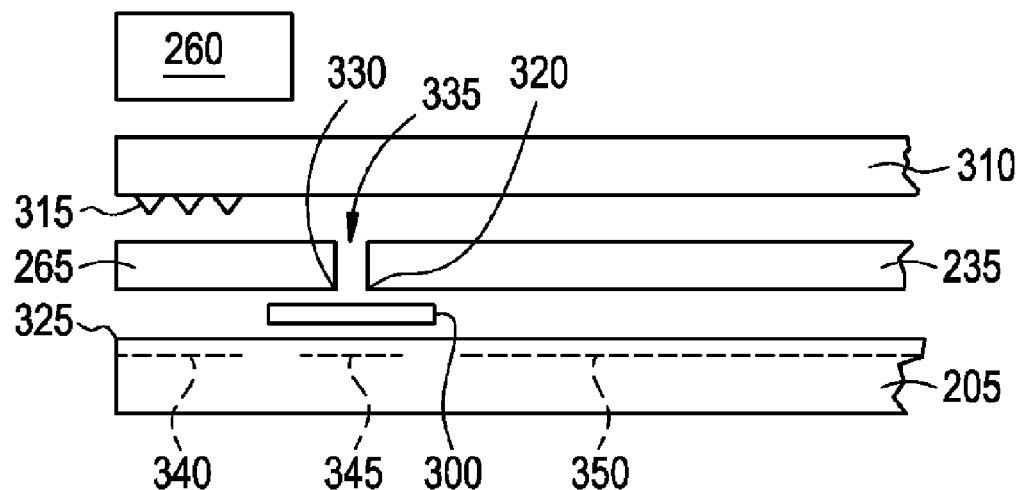
FIGS. 3-9 depict alternative partial views of Detail-A of FIG. 2.

Referring now to FIG. 3, in an embodiment protector member 300 is disposed between MEA 205 and GDL 235 such that protector member 300 traverses discontinuity 335 by extending over the edge of GDL 235. Load region 340 (depicted by dashed lines) represents that region of MEA 205 that experiences loading from sealing features 315 when cell 200 is under a compressive load. As depicted, protector member 300 does not extend all the way to the edge 325 of MEA 205 and does not extend into the load region 340. As such, protector member 300 has little or no influence on the active area loading. In addition to region 340, regions 345 and 350 are also depicted. Region 350 is that region of MEA 205 inboard of discontinuity 335 that defines an active area of MEA 205 that experiences a first pressure in response to cell 200 being operational, where an exemplary first pressure may be equal to order greater than about 50 psi (pounds per square inch) for example. Another exemplary first pressure may be equal to or greater than about 100 psi for example. Yet another exemplary first pressure may be on the order of about 80-200 psi for example. Region 345 is that region of MEA 205 proximate discontinuity 335 that defines a transition area of MEA 205 that experiences a second pressure in response to cell 200 being operational, the second pressure being greater than the first pressure, where an exemplary second pressure may be on the order of about 500-1500 psi for example. Region 340 is that region of MEA 205 outboard of discontinuity 335 that defines a sealing area of MEA 205 that experiences a third pressure in response to cell 200 being operational, the third pressure being greater than the second pressure, where an exemplary third pressure may be on the order of about 6000 psi or greater for example. While exemplary pressure ranges for regions 340, 345 and 350 have been disclosed, it will be appreciated that this is by way of example and not limitation, and that other pressures may be suitable for the purposes disclosed herein.

Figure 4:
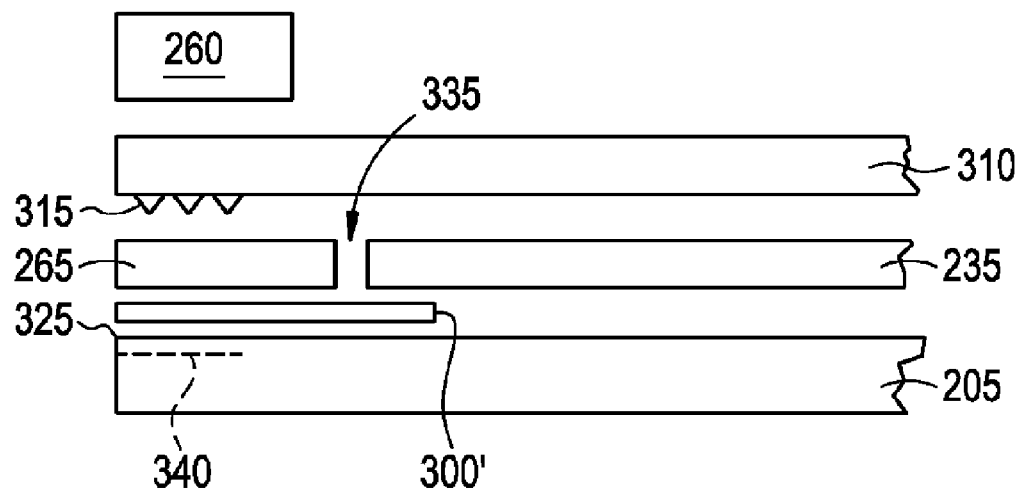

Referring now to FIG. 4, in an embodiment protector member 300' not only traverses discontinuity 335, but also extends to the edge 325 of MEA 205, thereby also extending into load region 340. As such, protector member 300' experiences loading from sealing features 315.

Figure 5:
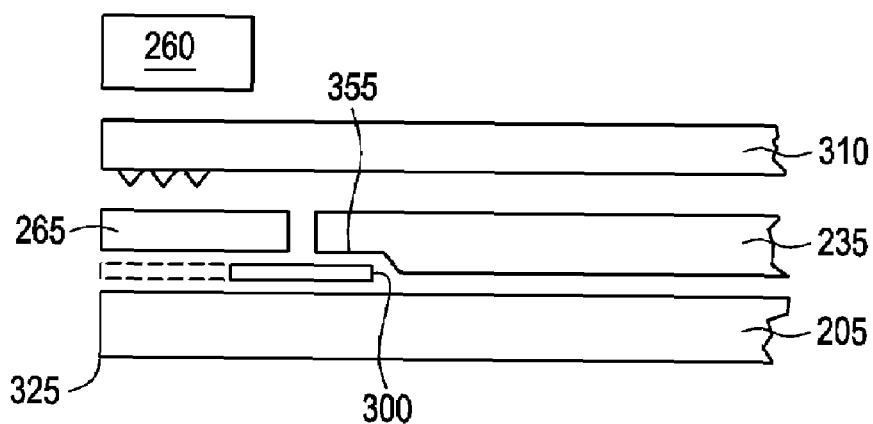
Figure 6:
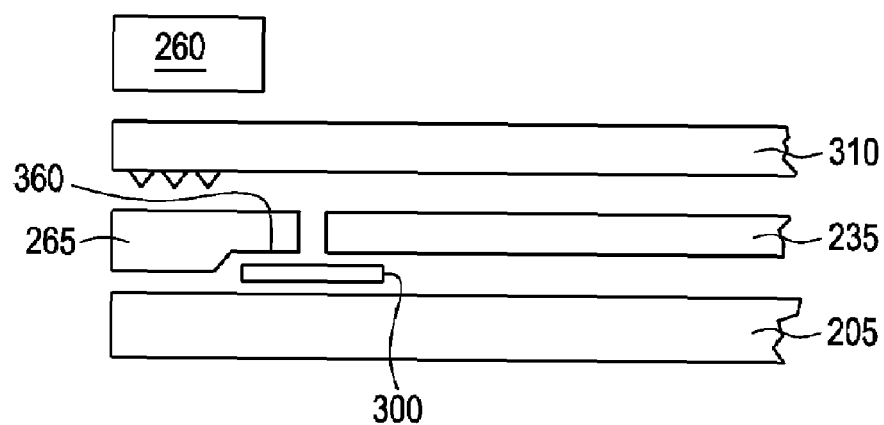
Figure 7:
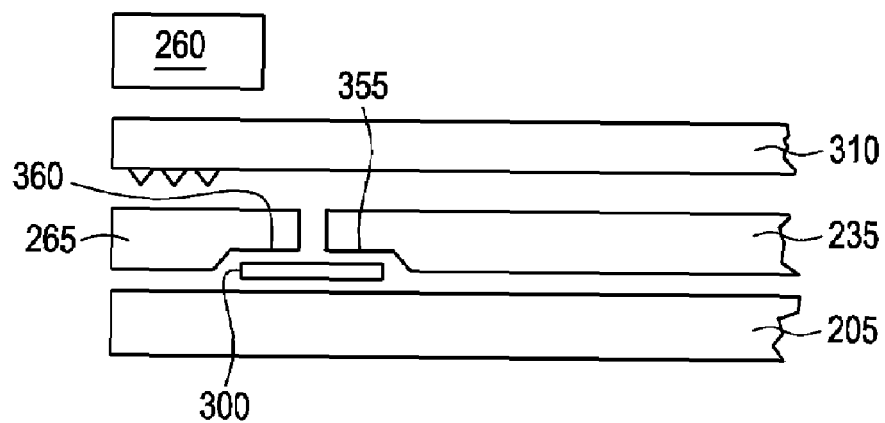

Referring now to FIGS. 5-7, embodiments of GDL 235 and/or sealing gasket 265 may have coined edges 355, 360 on the side receiving of the protector member 300, where protector member 300 is disposed at the coined regions.

As seen by viewing FIGS. 3-5 collectively, protector member 300 may or may not extend to the edge 325 of MEA 205 where GDL 235 has a coined edge 355, which is depicted generally by the dashed lines in FIG. 5 illustrating and extended protector member 300.

Figure 8:
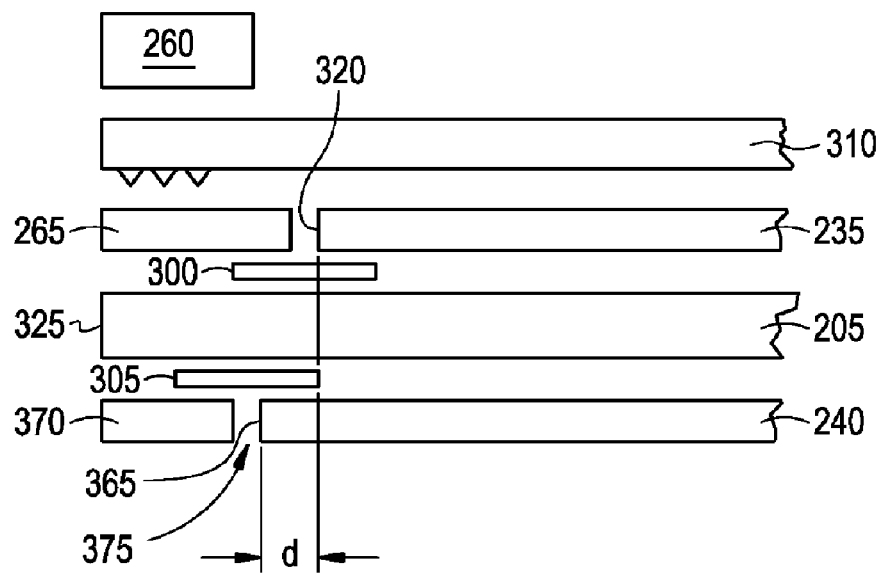

Referring now to FIG. 8, porous plate member 240 is disposed proximate the side of MEA 205 opposite that of GDL 235, where the edge 365 of porous plate 240 is disposed outboard a distance "d" from the edge 320 of GDL 235, and inboard from the edge 325 of MEA 205. A second sealing gasket 370 is disposed proximate the edge 365 of porous plate 240 and extends outward toward the edge 325 of MEA 205, thereby defining a second discontinuity 375 between the porous plate 240 and the second sealing gasket 370. As depicted, second protector member 305 is disposed between MEA 205 and porous plate 240 such that second protector member 305 traverses the second discontinuity 375 by extending over the edge of porous plate 240.

As previously discussed, protector member 300 may be bonded to GDL 235. In an exemplary embodiment, this bonding is established at the overlap region between protector member 300 and GDL 235, see FIGS. 2-8 for example. In an alternative embodiment, protector member 300 may be bonded in a similar fashion to sealing gasket 265, which may also be established at the overlap region between protector member 300 and sealing gasket 265, see again FIGS. 2-8. The bonding of protector member 300 to GDL 235 or sealing gasket 265 may be accomplished using any means suitable for the purpose, such as adhesive or melt-bonding for example. In a similar fashion, second protector member 305 may be bonded to porous plate 240 or to second sealing gasket 370.

Figure 9:
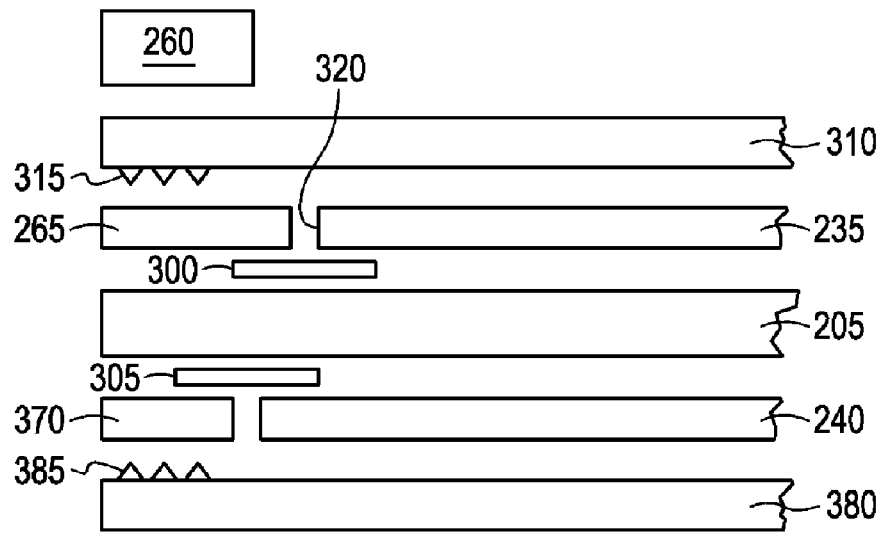

Referring now to FIG. 9, which is similar to that of FIG. 8 except that FIG. 9 also depicts a second plate member 380, such as a bipolar plate for example, disposed proximate the side of porous plate 240 opposite that of MEA 205 having a second sealing feature 385 that cooperate with second sealing gasket 370. Similar to the first protector member 300 previously discussed, second protector member 305 may or may not extend into the region of second sealing feature 385.

As previously discussed, protector members 300, 305 may be on the order of about 0.003 inches thick, which may be used with a GDL 235 that is about 0.016 inches thick, a MEA 205 that is about 0.017 inches thick, a porous plate 240 that is about 0.010 inches thick, a first sealing gasket 265 that is about 0.007 inches thick, and a second sealing gasket that is about 0.010 inches thick. However, it will be appreciated that the exemplary thicknesses disclosed herein are by way of example and not limitation, and that other material thicknesses may be employed for the purposes disclosed herein.

Figure 10:
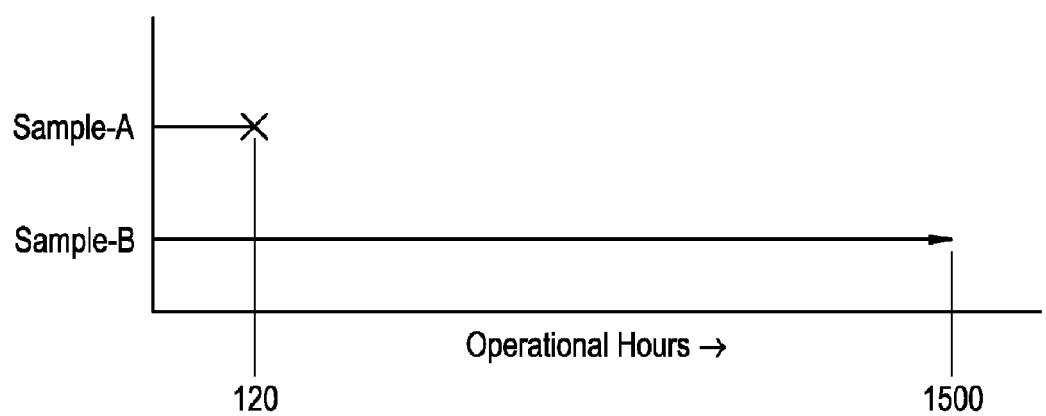
FIG. 10 illustrates observed performance information relating to embodiments with and without the benefit of an embodiment of the invention.

By employing protector members 300, 305 of suitable material and thickness, it has been observed that creep of membrane 220 at edge 320 of GDL 235 has been reduced under operational conditions, as evidenced by empirical data showing improved cell performance from about 120 operational hours to over 1500 operational hours, as illustrated in FIG. 10. In FIG. 10, Sample-A represents a cell 200 absent an embodiment of the invention, and Sample-B represents a cell 200 employing an embodiment of the invention. Operational time at operational pressures of an electrolysis cell is depicted on the abscissa. As illustrated, Sample-A malfunctioned at about 120 operational hours, while Sample-B continued to perform satisfactorily beyond 1500 operational hours.

Figure 11:
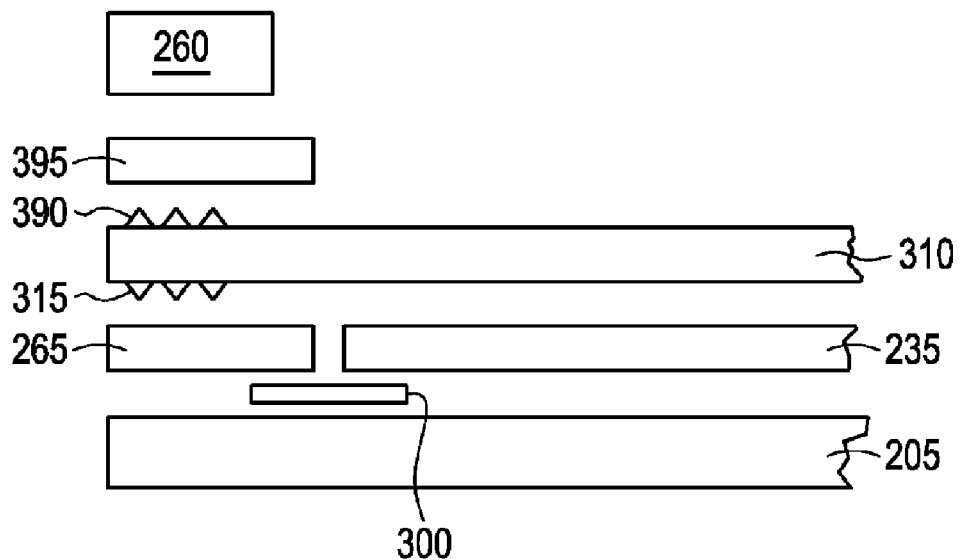
FIGS. 11-12 depict alternative embodiments to those depicted in FIGS. 3-9.
Figure 12:
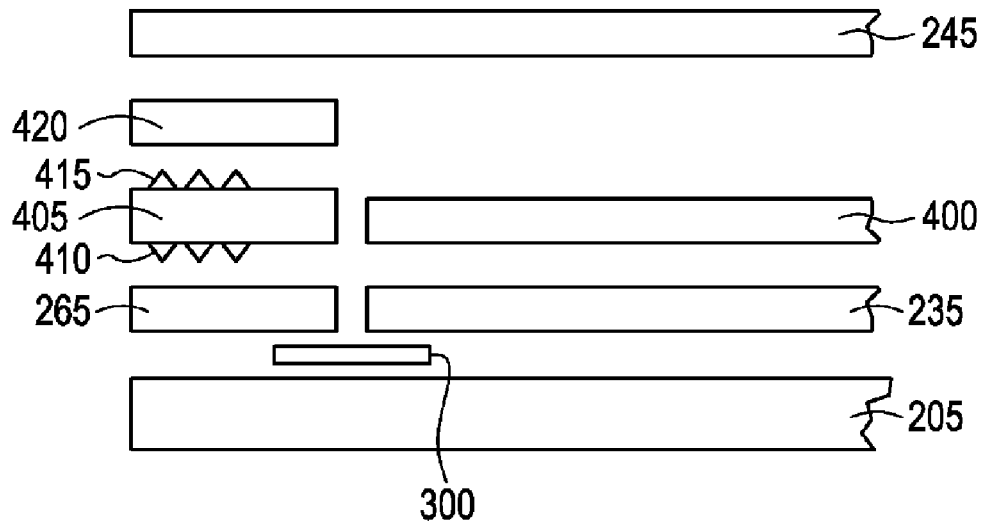

While FIGS. 3-9 illustrate a particular arrangement of parts, it will be appreciated that this is exemplary only, and that other embodiments of the invention may have a different arrangement of parts. For example, and referring now to FIG. 11, bipolar plate 310 may have sealing features 315 on one side and in cooperation with sealing gasket 265, and have sealing features 390 on the other side and in cooperation with sealing gasket 395. Here, sealing gasket 396 cooperates with frame 260. Alternatively, and referring now to FIG. 12, bipolar plate 310 may be replaced with a flow field member 400, disposed in flow field 225 (see FIG. 2), and a frame 405, which has sealing features 410 on one side and sealing features 415 on the other side. Here, sealing features 405 cooperate with sealing gasket 265, and sealing features 415 cooperate with a sealing gasket 420. Sealing gasket 420 seals against cell separator plate 245.

As will be appreciated from the foregoing, the exemplary embodiments described and illustrated herein are by way of example and not limitation, and one skilled in the art will recognize that other arrangements employing embodiments of the invention disclosed herein may be possible. Such arrangements are intended to fall within the scope of this invention.

In view of the foregoing, some embodiments of the invention may have some of the following advantages: an electrochemical cell, and particularly an electrolysis cell, having improved hours of operation; reduced creep of the membrane material of a PEM electrochemical cell at the edge of an adjacent flow field member, such as a GDL or porous plate, by having the protector member extend over the edge of the flow field member; membrane protection of a MEA against frayed edges of a carbon based GDL; reduced likelihood of gas crossover or electrical short through the MEA that may result from thinning of the membrane; use of non-conductive protector members provides added benefit by way of reduced oxidation, as opposed to conductive protector members; a bonded arrangement of protector member to flow field member provides for ease of assembly and dimensional control; and, use of a protector member that does not extend all the way to the edge of the MEA enables creep protection without altering the endplate and active area loading.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An electrochemical cell comprising:
a membrane electrode assembly (MEA);
a gas diffusion layer (GDL) disposed proximate a side of the MEA, an edge of the GDL disposed inboard of an edge of the MEA, said GDL having a coined region on an edge;
a sealing member disposed proximate the edge of the GDL and extending outward toward the edge of the MEA, thereby defining a discontinuity between the GDL and the sealing member; and
a protector member disposed between the MEA and the GDL in the coined region of the GDL, such that the protector member traverses the discontinuity.

2. The electrochemical cell of claim 1, further comprising:
a plate member disposed proximate the side of the GDL opposite that of the MEA, the plate member having a sealing feature that cooperates with the sealing member.

3. The electrochemical cell of claim 2, wherein:
the plate member comprises a bipolar plate.

4. The electrochemical cell of claim 2, wherein:
the protector member does not extend into the region of the sealing feature of the plate member.

5. The electrochemical cell of claim 1, wherein:
the region of the MEA inboard of the discontinuity defines an active area including an electrode, wherein the cell applies a first pressure on the active area;
the region of the MEA proximate the discontinuity defines a transition area, wherein the cell applies a second pressure on the transition area, the second pressure being greater than the first pressure; and
the region of the MEA outboard of the discontinuity defines a sealing area, wherein the cell applies a third pressure on the sealing area, the third pressure being greater than the second pressure.

6. The electrochemical cell of claim 5, wherein:
the first pressure is equal to or greater than about 50 pounds per square inch.

7. The electrochemical cell of claim 6, wherein:
the first pressure is equal to or greater than about 100 pounds per square inch.

8. The electrochemical cell of claim 1, wherein:
the protector member extends to the edge of the MEA that is outboard of the coined edge of the GDL.

9. The electrochemical cell of claim 1, further comprising:
a porous member disposed proximate the side of the MEA opposite that of the GDL, an edge of the porous member disposed outboard of the edge of the GDL and inboard of the edge of the MEA; and
a second sealing member disposed proximate the edge of the porous member and extending outward toward the edge of the MEA, thereby defining a second discontinuity between the porous member and the second sealing member.

10. The electrochemical cell of claim 9, further comprising:
a second protector member disposed between the MEA and the porous member such that the second protector member traverses the second discontinuity.

11. The electrochemical cell of claim 10, wherein:
the second protector member is bonded to the porous member.

12. The electrochemical cell of claim 10, further comprising:
a first plate member disposed proximate the side of the GDL opposite that of the MEA, the first plate member having a first sealing feature that cooperates with the first sealing member;
a second plate member disposed proximate the side of the porous member opposite that of the MEA, the second plate member having a second sealing feature that cooperates with the second sealing member.

13. The electrochemical cell of claim 1, wherein:
the GDL comprises carbon and the edge of the GDL inboard of the edge of the MEA comprises frays.

14. The electrochemical cell of claim 1, wherein:
the protector member is bonded to the GDL.

15. The electrochemical cell of claim 14, wherein:
the protector member is bonded to the GDL via adhesive or melt-bonding.

16. The electrochemical cell of claim 1, wherein:
the protector member is bonded to the sealing member.

17. The electrochemical cell of claim 1, wherein:
the protector member has a thickness that is equal to or less than about ¼ of the thickness of the GDL.

18. The electrochemical cell of claim 1, wherein:
the protector member is electrically non-conductive.

19. An electrochemical cell comprising:
a membrane electrode assembly (MEA);
a gas diffusion layer (GDL) disposed proximate a side of the MEA, an edge of the GDL disposed inboard of an edge of the MEA;
a sealing member disposed proximate the edge of the GDL and extending outward toward the edge of the MEA, thereby defining a discontinuity between the GDL and the sealing member; and
a protector member disposed between the MEA and the GDL such that the protector member traverses the discontinuity;
wherein the edge of the sealing member proximate the GDL has a coined region on the side receiving of the protector member, the protector member being disposed at the coined region of the sealing member.

20. The electrochemical cell of claim 19, wherein:
the edge of the GDL has a coined region on the side receiving of the protector member, the protector member being disposed at the coined region of the GDL.

21. A proton exchange membrane electrolysis cell, comprising:
a membrane electrode assembly (MEA);
a gas diffusion layer (GDL) disposed proximate a side of the MEA, an edge of the GDL disposed inboard of an edge of the MEA;
a sealing member disposed proximate the edge of the GDL and extending outward toward the edge of the MEA, thereby defining a discontinuity between the GDL and the sealing member;

a protector member disposed between the MEA and the GDL, and between the sealing member and the MEA, the protector member having an outer edge offset from the edge of the MEA, such that the protector member traverses the discontinuity and the MEA contacts the sealing member;

a porous member disposed proximate the side of the MEA opposite that of the GDL; and a first cell separator plate disposed on one side of the MEA and a second cell separator plate disposed on the other side of the MEA, the cell separator plates configured to retain the MEA, the GDL, the sealing member, the protector member, and the porous member under operational conditions;

wherein the region of the MEA inboard of the discontinuity defines an active area that experiences a pressure equal to or greater than about 100 pounds per square inch in response to the cell being operational.

22. An electro chemical cell comprising:

a membrane electrode assembly (MEA);

a gas diffusion layer (GDL) disposed proximate a side of the MEA, an edge of the GDL disposed inboard of an edge of the MEA;

a first sealing member disposed proximate the edge of the GDL and extending outward toward the edge of the MEA, thereby defining a discontinuity between the GDL and the first sealing member;

a protector member disposed between the MEA and the GDL, and between the sealing member and the MEA, the protector having an outer edge offset from the edge of the MEA, such that the protector member traverses the discontinuity and the MEA contacts the sealing member, the protector member having a thickness equal to or less than about ¼ of the thickness of the GDL and being bonded to the GDL;

a flow field member disposed proximate the side of the MEA opposite that of the GDL, an edge of the flow field member disposed inboard of the edge of the MEA ;

a second sealing member disposed proximate the edge of the flow field member and extending outward toward the edge of the MEA;

a first plate member disposed proximate the side of the GDL opposite that of the MEA, the first plate member having a first sealing feature that cooperates with the first sealing member; and a second plate member disposed proximate the side of the flow field member opposite that of the MEA, the second plate member having a second sealing feature that cooperates with the second sealing member.

23. An electrolysis cell for generating high pressure hydrogen comprising:

a membrane electrode assembly (MEA) having a membrane that includes a catalyst;

a gas diffusion layer (GDL) disposed proximate a side of the membrane, an edge of the GDL disposed inboard of an edge of the membrane;

a sealing member disposed proximate the edge of the GDL and extending outwardly toward the edge of the membrane, thereby defining a discontinuity between the GDL and the sealing member; and a protector member disposed between the MEA and the GDL, and between the sealing member and the MEA, the protector member having an outer edge offset from the edge of the MEA, such that the protector member traverses the discontinuity and prevents creep of the MEA, where the MEA contacts the sealing member.

* * * * *

UNITED STATES PATENT AND TRADEMARK OFFICE
CERTIFICATE OF CORRECTION

PATENT NO. : 7,507,493 B2
APPLICATION NO. : 10/908879
DATED : March 24, 2009
INVENTOR(S) : Jacob Friedman et al.

It is certified that error appears in the above-identified patent and that said Letters Patent is hereby corrected as shown below:

In the bibliographic data, First page, column 1, for the Assignee, delete "Froton" and insert --Proton--

In the description, column 1, line 43, delete "catatlyst" and insert --catalyst--

In the description, column 6, line 18, delete "KALREZÒ" and insert --KALREZ(R)--

In the description, column 6, line 20, delete "VITONÒ" and insert --VITON(R)--

In the description, column 6, line 20, delete "FLUORELÒ" and insert --FLUOREL(R)--

In the claims, column 11, line 19, claim 22, line 1, delete "electro chemical" and insert --electrochemical--

In the claims, column 12, line 3, claim 22, line 14, delete "MEA ;" and insert --MEA;--

Signed and Sealed this

Sixteenth Day of June, 2009

JOHN DOLL
*Acting Director of the United States Patent and Trademark Office*